(12) United States Patent
Chou

(10) Patent No.: US 11,408,412 B2
(45) Date of Patent: Aug. 9, 2022

(54) ENCLOSURE FOR AIR COMPRESSOR

(71) Applicant: UNIK WORLD INDUSTRIAL CO., LTD., Tainan (TW)

(72) Inventor: Wen-San Chou, Tainan (TW)

(73) Assignee: UNIK WORLD INDUSTRIAL CO., LTD., Tainan (TW)

( * ) Notice: Subject to any disclaimer, the term of this patent is extended or adjusted under 35 U.S.C. 154(b) by 925 days.

(21) Appl. No.: 16/203,592

(22) Filed: Nov. 28, 2018

(65) Prior Publication Data

US 2019/0162176 A1    May 30, 2019

(51) Int. Cl.
| | |
|---|---|
| *F04B 39/12* | (2006.01) |
| *B60S 5/04* | (2006.01) |
| *F04B 39/14* | (2006.01) |
| *F04D 29/40* | (2006.01) |
| *B25B 27/02* | (2006.01) |

(52) U.S. Cl.
CPC ............ *F04B 39/121* (2013.01); *B25B 27/02* (2013.01); *B60S 5/04* (2013.01); *F04B 39/14* (2013.01); *F04D 29/403* (2013.01); *F05B 2240/14* (2013.01); *F05B 2260/30* (2013.01)

(58) Field of Classification Search
CPC ............... Y10T 403/60; Y10T 403/591; Y10T 403/1641; Y10T 403/7037; F16B 21/08; F16B 21/082; F16B 21/088; F04B 27/1081; F04B 27/0873; F04B 29/403; F04B 35/06; F04B 39/12; B60S 5/04; B65D 2543/00694; B65D 2543/008; B65D 2543/00768; B65D 43/22; B65D 43/0204; B65D 45/16; B65D 11/188; B25B 27/14; B25B 27/02
USPC ............................. 220/780, 784; 81/44, 486
See application file for complete search history.

(56) References Cited

U.S. PATENT DOCUMENTS

| | | | |
|---|---|---|---|
| 2013/0180097 A1* | 7/2013 | Serrada Iranzo | ..... F16B 5/0628 29/525.01 |
| 2015/0337825 A1* | 11/2015 | Chou | ...................... F04B 37/18 417/415 |

FOREIGN PATENT DOCUMENTS

WO   WO-2006120344 A1 * 11/2006 ............... B62D 1/16

* cited by examiner

*Primary Examiner* — Kenneth J Hansen

(57) ABSTRACT

An enclosure for air compressors is generally composed of a first shell body and a second shell body, wherein the first shell body defines a plurality of through holes, and the second shell body is formed with a plurality of snap joints. Each through hole is defined by a cylindrical surface and a substantially conical surface, between which a step is defined. In use, the snap joints can be inserted into the through holes respectively to have the snap joints snatched by the steps 14 formed in the through holes, so that the first and second shell bodies can be quickly assembled. In addition, a disassembly tool can be inserted into each through hole to have the snap joints removed from the through holes, so that the enclosure can be quickly disassembled.

5 Claims, 7 Drawing Sheets

ENCLOSURE FOR AIR COMPRESSOR

(a) TECHNICAL FIELD OF THE INVENTION

The present invention relates to an enclosure for an compressor and more particularly, to an enclosure that can be quickly assembled and disassembled.

(b) DESCRIPTION OF THE PRIOR ART

Air compressors are usually employed to inflate objects such as air cushions or tires. Generally, portable air compressors are manufactured in small size, so that they can be carried easily. Furthermore, a portable air compressor can be powered by a handheld DC power supply or a cigarette lighter socket in a vehicle. Conventionally, a portable air compressor employs a box to accommodate a compressor unit therein, wherein the compressor unit employs a motor to drive a piston body to conduct reciprocating motion in a cylinder to produce compressed air, which can be transferred to an object that needs to be inflated. Currently, emergency repair kits, which employ a low-power motor, are used to repair punctured tires. However, in some countries, the Traffic Act stipulates that, when a punctured tire happens to a vehicle on a highway, the driver should repair the punctured tire within a specified period and should immediately drive away after the repair is completed to prevent rearward bump. Thus, there is a need for an air compressure enclosure to be opened and closed quickly to facilitate repairing tires.

SUMMARY OF THE INVENTION

One object of the present invention is to provide an enclosure for air compressors, which is generally composed of a first shell body and a second shell body, wherein the first shell body defines a plurality of through holes, and the second shell body is formed with a plurality of snap joints. Each through hole is defined by a cylindrical surface and a substantially conical surface, between which a step is defined. Each snap joint is composed of two opposing cantilever pieces, between which a gap is defined, wherein each cantilever piece has an enlarged end that is configured with a bevel surface opposite to the gap. In use, the snap joints can be inserted into the through holes respectively to have the enlarged ends of each snap joint snatched by the step formed in each through hole, so that the first and second shell bodies can be quickly assembled. In addition, a disassembly tool can be inserted into each through hole to have the enlarged ends of the snap joints go past the reduced holes at the steps 14, and thus the snap joints can be removed from the through holes, so that the enclosure can be quickly disassembled.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
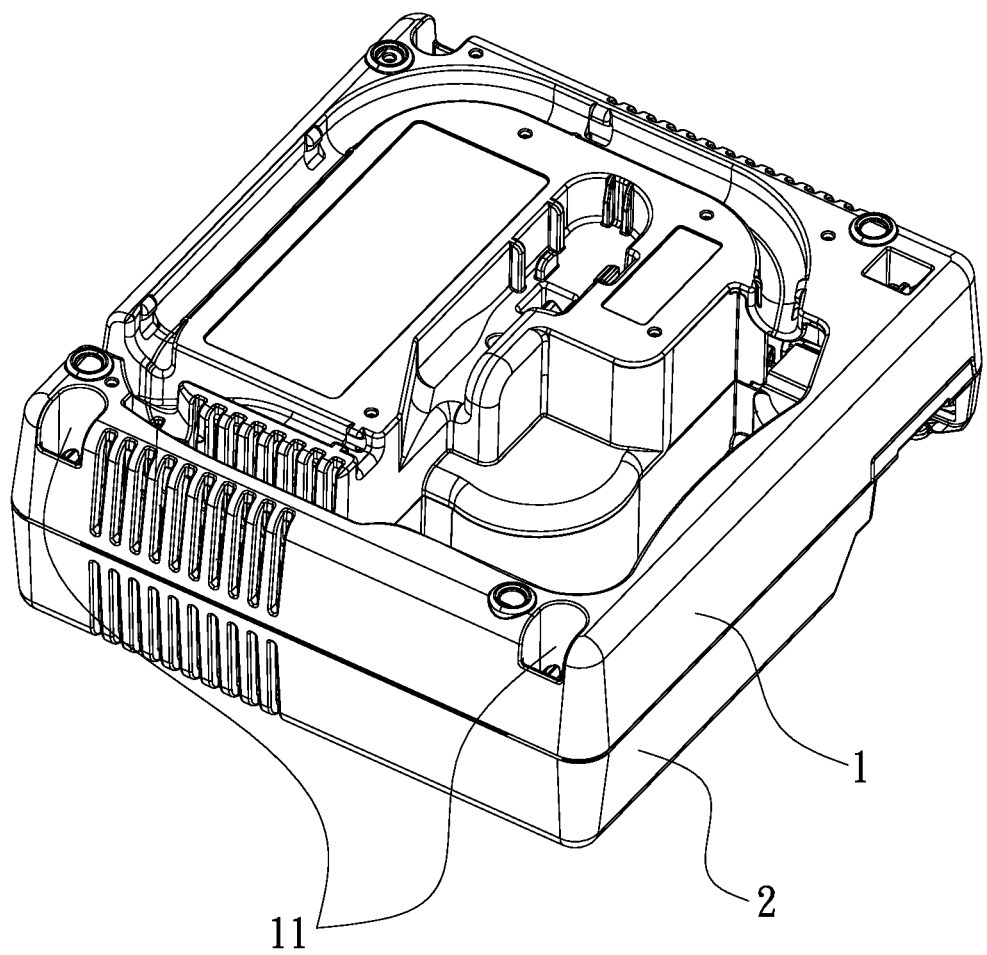
FIG. 1 shows a 3-dimensional view of an enclosure for accommodating air compressors according to one embodiment of the present invention.
Figure 2:
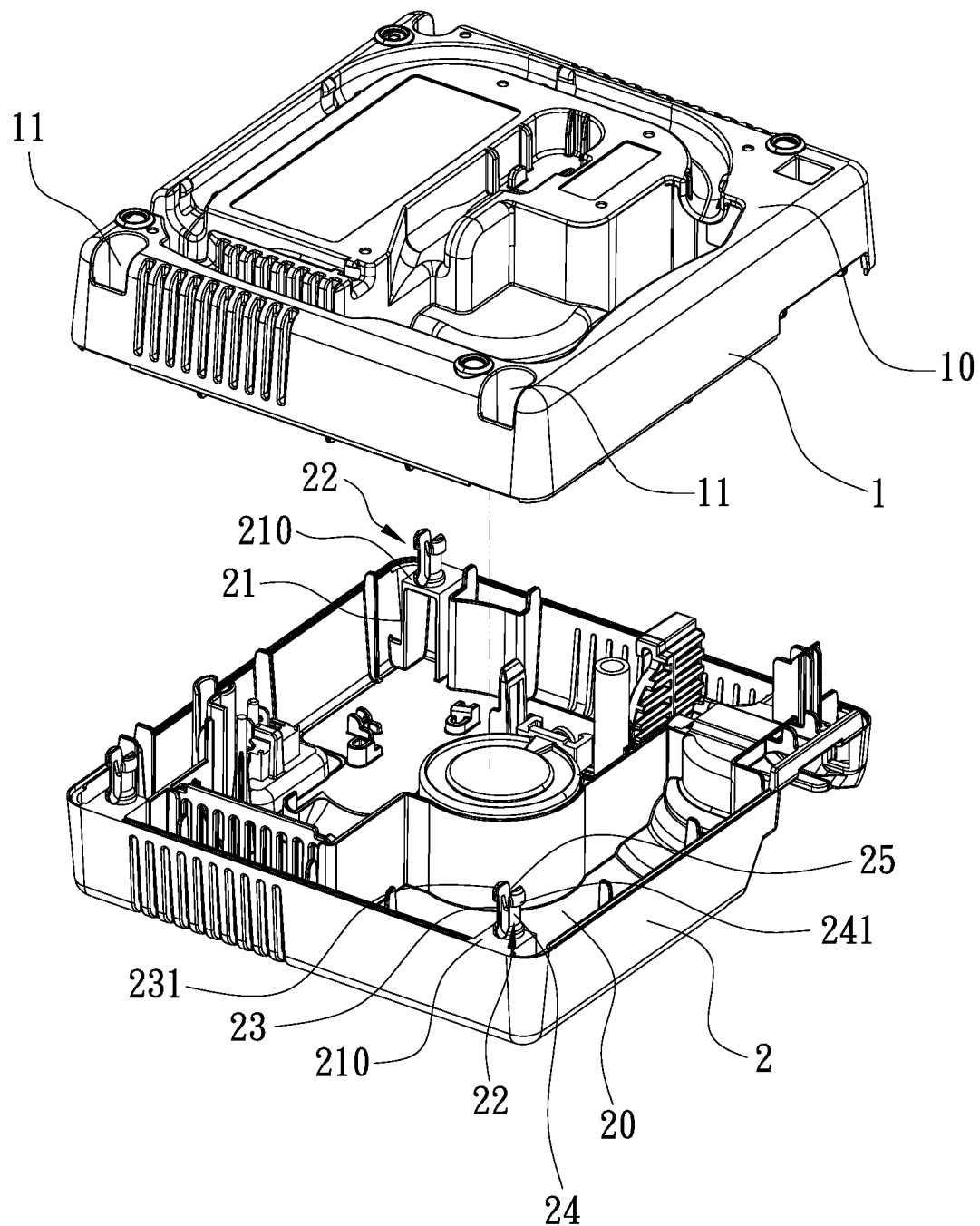
FIG. 2 shows an exploded view of the enclosure, wherein the enclosure is disassembled into a first shell body and a second shell body.

Referring to FIGS. 1 and 2, an enclosure for accommodating an air compressor is shown, which is generally composed of a first shell body 1 and a second shell body 2. An air compressor (not shown) can be located in a space of the enclosure assembled by the two shell bodies.

Figure 3:
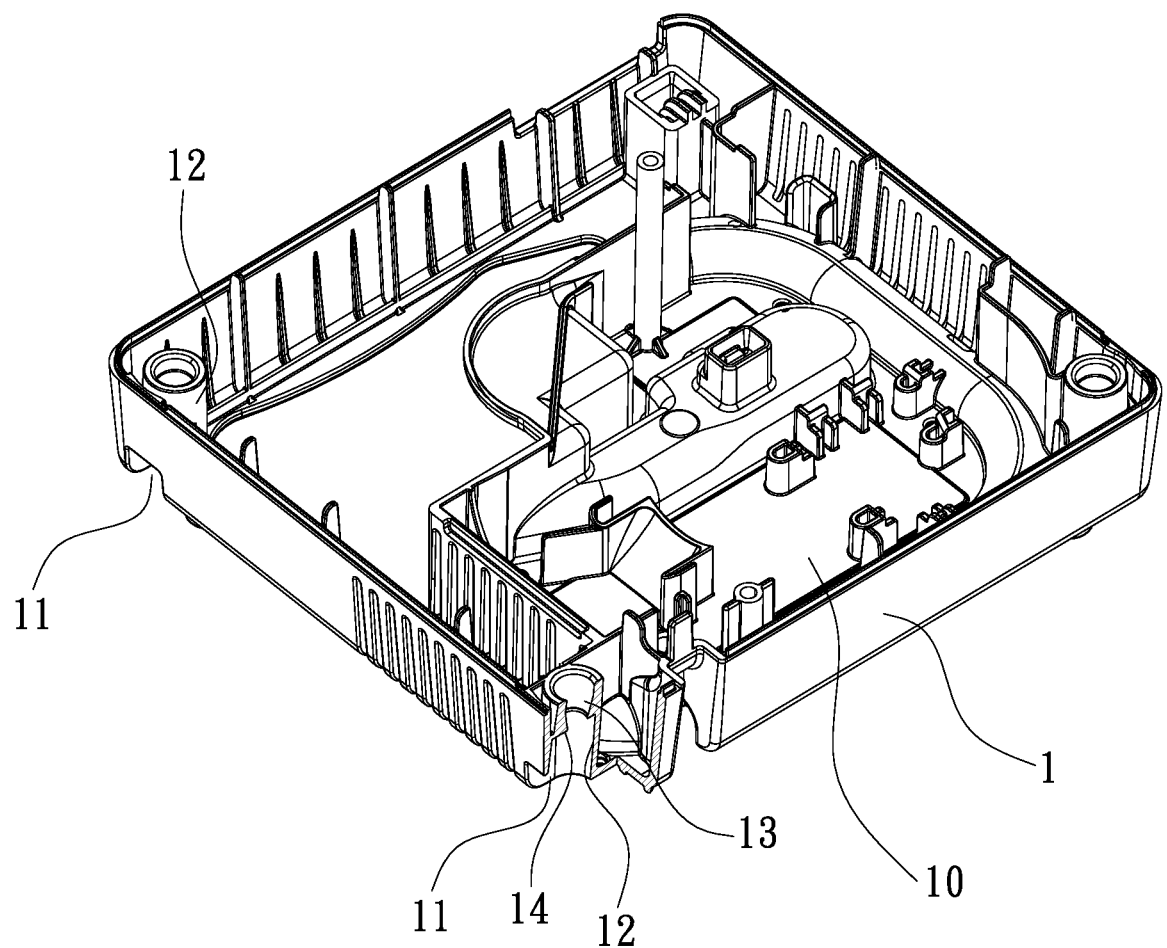
FIG. 3 shows a 3-dimensional view of the first shell body.
Figure 4:
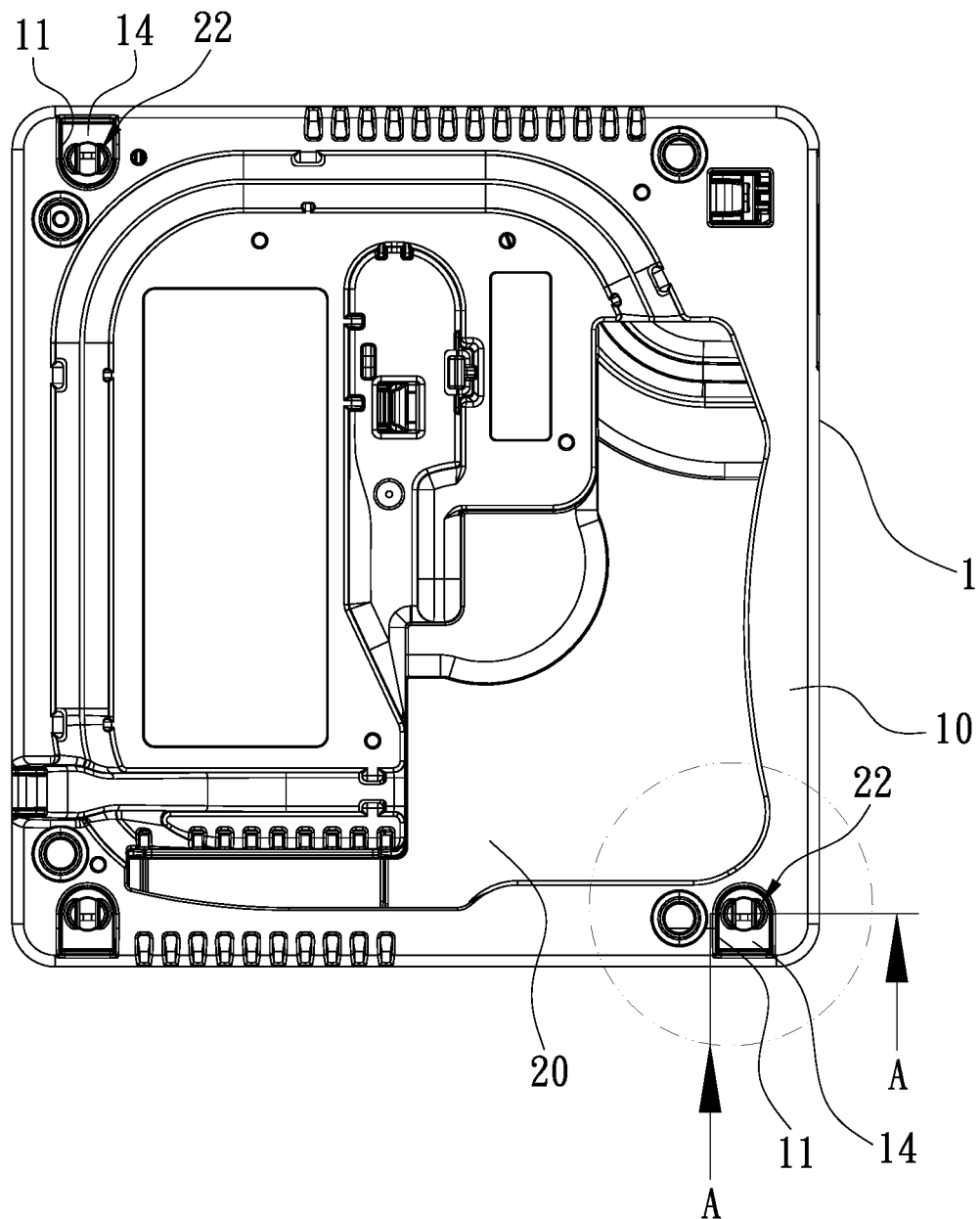
FIG. 4 shows a top view of the enclosure.

Referring to FIG. 3, the first shell body 1 is shown as a rectangular body with a bottom 10. The first shell body 1 is formed with four tubular columns 12, which extend upwardly or vertically from the bottom 10. Each tubular column 12 has a through hole 11 defined by a cylindrical surface and a substantially conical surface 13, which extend in a direction perpendicular to the bottom 10. The substantially conical surface 13 tapers towards the bottom 10 on which the cylindrical surface commences, to form a step 14 between the cylindrical surface and the substantially conical surface 13, wherein the step 14 defines a reduced hole.

Figure 5:
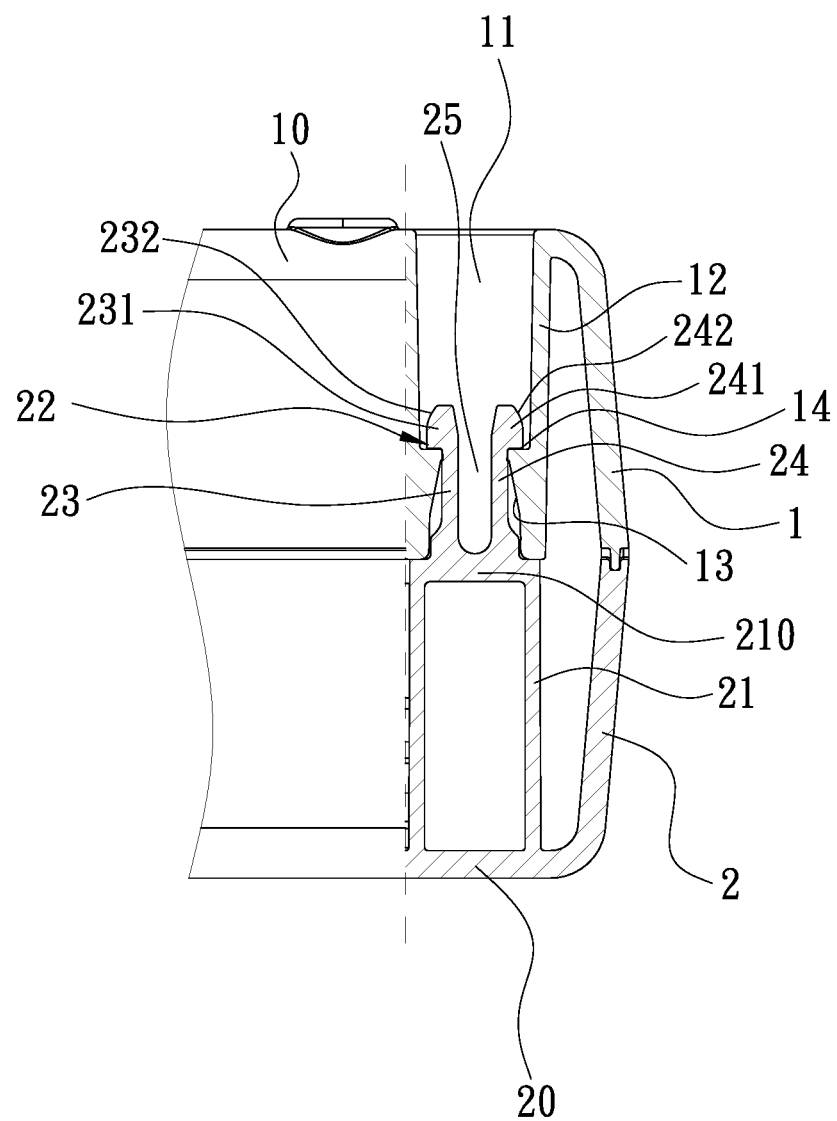
FIG. 5 shows an enlarged sectional view taken along line A-A in FIG. 4.
Figure 6:
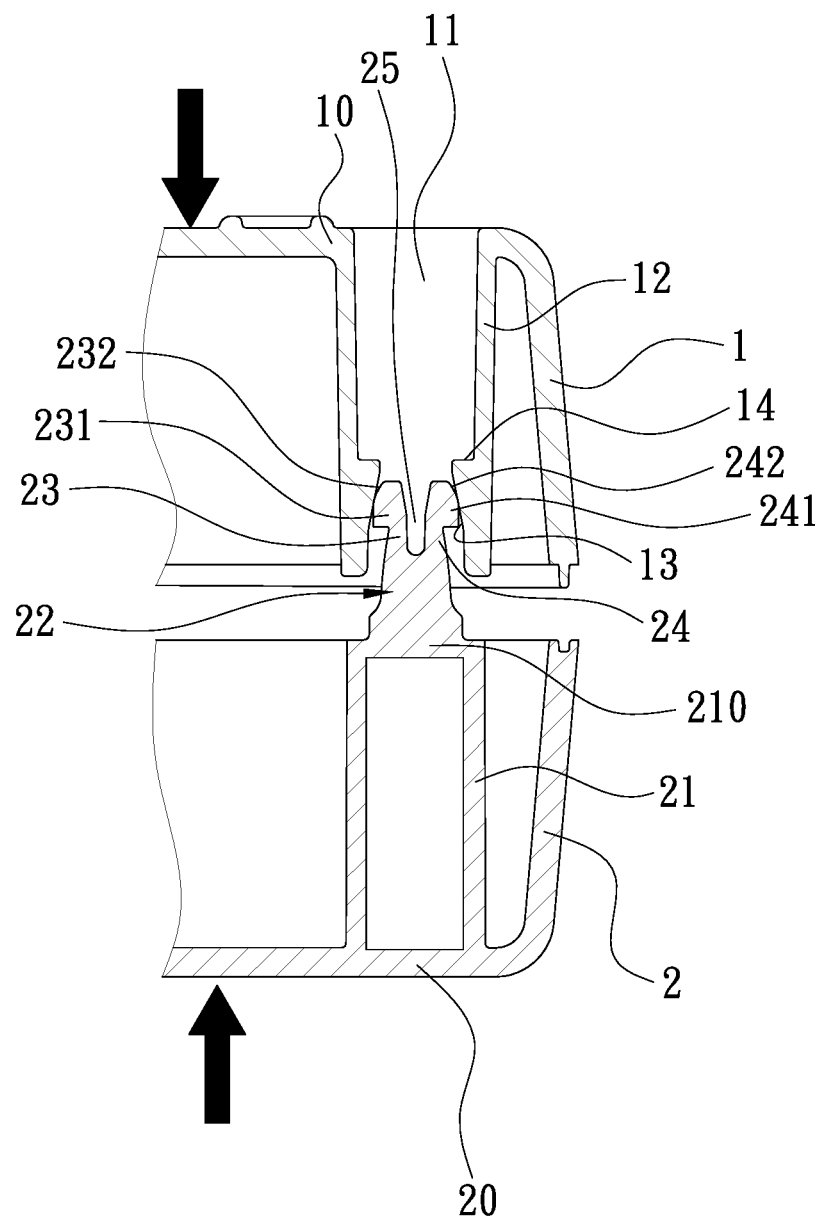
FIG. 6 shows a schematic sectional view of the present invention, illustrating a process of assembling the first and second shell bodies.
Figure 7:
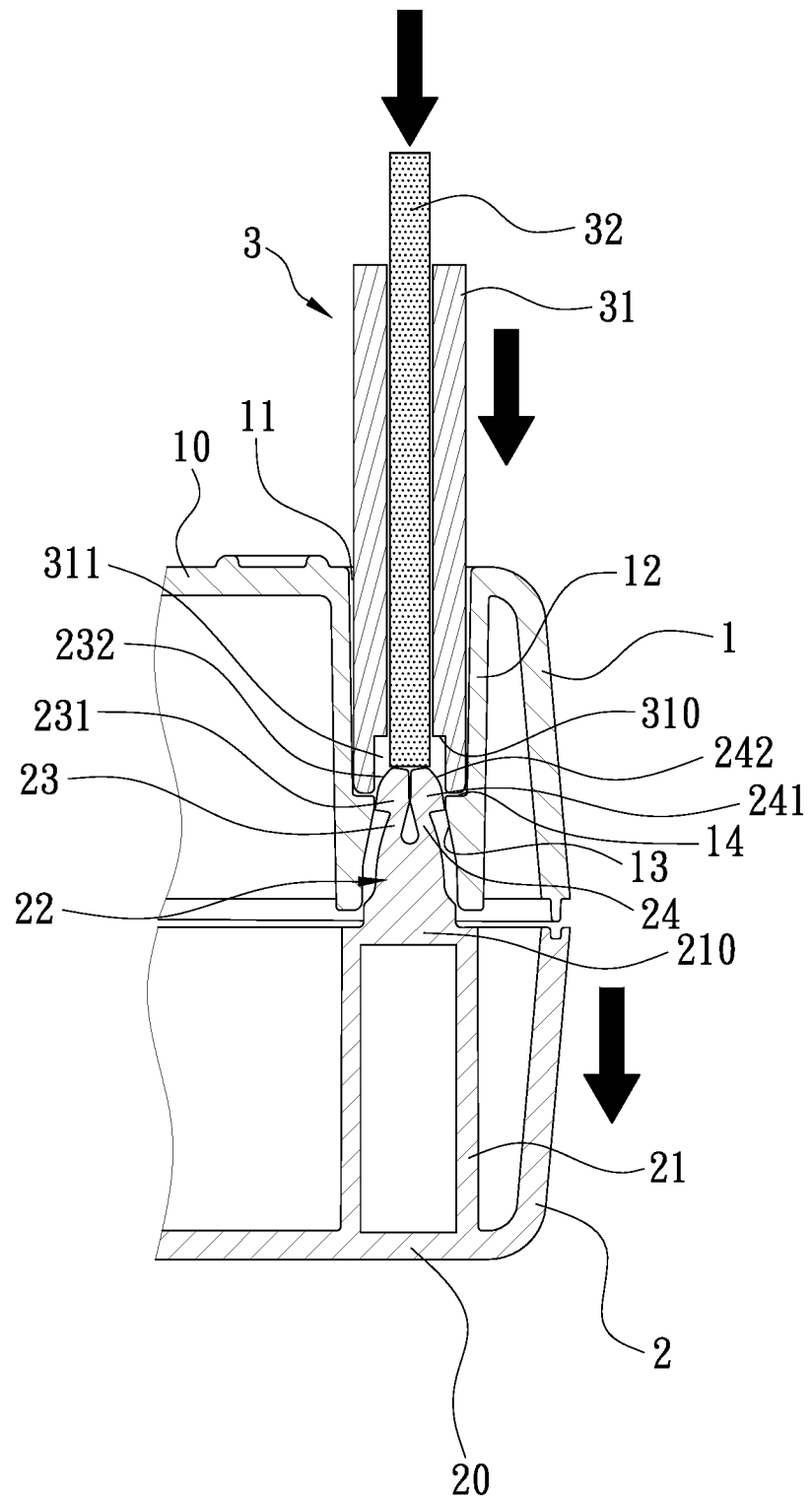
FIG. 7 shows a schematic sectional view of the present invention, illustrating a process of disassembling the enclosure with a disassembly tool.

Referring to FIG. 2, the second shell body 2 is shown as a rectangular body provided with four inverted U-shaped supports 21 at a bottom 20 thereof. Each support 21 has a top surface 210, on which a snap joint 22 is formed. As shown, each snap joint 22 is composed of two opposing cantilever pieces 23, 24 (see also FIG. 5), between which a gap 25 is defined. More specifically, each cantilever piece extends upwardly from the top surface 210 of an inverted U-shaped support 21, and terminates at an enlarged end 231 or 241 that is configured with a bevel surface 232 or 242 opposite or away from the gap 25. It is noted that each cantilever piece excluding its enlarged end extends for a length approximately equal to the substantially conical surface 13 extending perpendicular to the bottom 10 of the first shell body 1.

Referring to FIGS. 4 through 7, for assembling the first and second shell bodies 1, 2 together, a user can insert the snap joints 22 into the through holes 11, respectively. During the assembling process, the conical surface 13 of a through hole 11 may contact the bevel surfaces 232, 242 of the cantilever pieces 23, 24 of a snap joint 22, thus deflecting the two cantilever pieces 23, 24 of the snap joint 22 to approach each other. Consequently, the enlarged ends 231, 241 of the cantilever pieces 23, 24 of the snap joint 22 may go past the reduced hole defined at the step 14 in the through hole 11. Thereafter, the two cantilever pieces 23, 24 of the snap joint 22 may return to their normal shapes, and thus the enlarged ends 231, 241 of the cantilever pieces 23, 24 of the snap joint 22 can be snatched by the step 14 formed in the through hole 11 (see FIG. 5). Meanwhile, a tubular column 12 defining the through hole 11 can be brought in contact with the top surface 210 of an inverted U-shaped support 21. As a result, the first and second shell bodies 1, 2 can be quickly assembled.

To facilitate disassembling the enclosure, a disassembly tool 3 is disclosed in the present invention (see FIG. 7), which includes a tube 31 and a central shaft 32. The tube 31 defines a passage therethrough and defines a recess 311 communicating with the passage at one end, which is referred to as a working end. The recess 311 has a diameter greater than the passage, thus forming an annular bottom surface 310 at the recess's bottom. The recess 311 has a diameter approximately equal to that of the reduced hole defined at the step 14 of each through hole 11. The central shaft 32 can be inserted through the passage of the tube 31 to enter the recess 311.

Referring again to FIG. 7, for disassembling the enclosure, a user can insert the disassembly tool 3 into each through hole 11 via an opening corresponding to the cylindrical surface of a through hole 11 to abut on the step 14 in the through hole 11, such that the working end of the tube 31 may contact the bevel surfaces 232, 242 of the snap joint 22 in the through hole 11 to have the two cantilever pieces 23, 24 of the snap joint 22 approach each other. Thereafter, the central shaft 32 can be pushed downwardly to have the enlarged ends 231, 241 of the cantilever pieces 23, 24 to pass the reduced hole at the step 24, so that the snap joint 22 can be removed from the through hole 11. Consequently, the enclosure can be quickly disassembled into the first and second shell bodies 1, 2.

As a summary, the present invention provides an improved enclosure for air compressors, which is composed of a first shell body 1 and a second shell body 2, wherein the snap joints 22 of the second shell body 2 can be inserted into the through holes 11 of the first shell body 1 respectively to have the enlarged ends 231, 241 of each snap joint 22 snatched by the step 14 formed in each through hole 11, so that the first and second shell bodies 1, 2 can be quickly assembled. In addition, the disassembly tool 3 can be inserted into each through hole 11 to have the enlarged ends 231, 241 of the snap joints 22 go past the reduced holes defined at the steps 14 to be released therefrom, so that the enclosure can be quickly disassembled.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the scope of the invention.

I claim:

1. An enclosure comprising a first shell body and a second shell body for accommodating an air compressor, wherein:
the first shell body defines a plurality of through holes, each through hole defined by a cylindrical surface and a substantially conical surface, which extend in a direction perpendicular to a bottom of the first shell body, wherein the substantially conical surface tapers towards the bottom of the first shell body to form a step between the cylindrical surface and the substantially conical surface, the step defining a reduced hole; and
the second shell body is formed with a plurality of snap joints corresponding to the through holes; whereby the snap joints are insertable into the through holes, respectively, such that each snap joint is movable along the substantially conical surface of a corresponding through hole to engage the step therein, to assemble the first and second shell bodies.

2. The enclosure of claim 1, wherein each through hole is defined in a tubular column extending upwardly from the bottom of the first shell body.

3. The enclosure of claim 2, wherein each snap joint is formed on a top surface of an inverted U-shaped support formed at a bottom of the second shell body; each snap joint comprises two opposing cantilever pieces, between which a gap is defined, each cantilever piece extending upwardly from the top surface of a corresponding inverted U-shaped support and terminating at an enlarged end that is configured with a beveled surface opposite the gap; whereby when the snap joints are inserted into the through holes respectively, the two cantilever pieces of each snap joint are deflected to approach each other, so that the enlarged ends thereof go past the reduced hole defined at the step in a corresponding through hole, so that the enlarged ends engage the step, and furthermore, a tubular column which defines the corresponding through hole is brought into contact with the top surface of the corresponding inverted U-shaped support, so that the first and second shell bodies are assembled.

4. The enclosure of claim 3, further comprising a disassembly tool including a tube, which defines a passage therethrough and a recess at a working end thereof communicating with the passage, and a central shaft slidably fitted through the passage of the tube, wherein the recess has a diameter approximately equal to the reduced hole defined at the step in each through hole, whereby the disassembly tool is insertable into each through hole to cause the working end thereof to abut on the step therein, the cantilever pieces of a corresponding snap joint deflected by the working end to approach each other, and then, the central shaft is pushed downwardly to have the enlarged ends of the corresponding snap joint to go past the reduced hole defined at the step to be released from the step, and thus the corresponding snap joint is removable from a corresponding through hole, so that the enclosure is disassembled.

5. An air compressor enclosure system comprising:
a first shell body defining a plurality of through holes, each through hole defined by a cylindrical surface and a substantially conical surface, which extend in a direction perpendicular to a bottom of the first shell body, wherein the substantially conical surface tapers towards the bottom of the first shell body to form a step between the cylindrical surface and the substantially conical surface, the step defining a reduced hole;
a second shell body formed with a plurality of snap joints corresponding to the through holes of the first shell body, wherein each snap joint comprises two opposing cantilever pieces, between which a gap is defined, each cantilever piece terminating at an enlarged end that is configured with a beveled surface opposite the gap; and
a disassembly tool including a tube, which defines a passage therethrough and a recess at a working end thereof communicating with the passage, and a central shaft slidably fitted through the passage of the tube, wherein the recess has a diameter approximately equal to the reduced hole defined at the step in each through hole;
whereby the snap joints are insertable into the through holes, respectively, such that each snap joint is movable along the substantially conical surface of a corresponding through hole to engage the step therein, to assemble the first and second shell bodies; and
the disassembly tool is insertable into each through hole to cause the working end thereof to abut the step therein, and thus the cantilever pieces of a corresponding snap joint are deflected by the working end to approach each other, and then, the central shaft is pushed downwardly to cause the enlarged ends of the corresponding snap joint to go past the reduced hole defined at the step to release from the step, and thus the corresponding snap joint is removable from a corresponding through hole, so that the first and second bodies are disassembled.

* * * * *